United States Patent [19]

Walter et al.

[11] Patent Number: 5,001,924

[45] Date of Patent: Mar. 26, 1991

[54] VOLUMETRIC MEASUREMENT OF TANK VOLUME

[75] Inventors: Richard T. Walter, Seabrook; Paul D. Van Buskirk, Corpus Christi; William F. Weber, Webster; Richard C. Froebel, Houston, all of Tex.

[73] Assignee: The United States of America as represented by the Administrator of the National Aeronautics and Space Administration, Washington, D.C.

[21] Appl. No.: 458,258

[22] Filed: Dec. 28, 1989

[51] Int. Cl.$^5$ ............................................... G01F 17/00
[52] U.S. Cl. ..................................................... 73/149
[58] Field of Search ........................... 73/149, 290 B

[56] References Cited

U.S. PATENT DOCUMENTS

| | | | |
|---|---|---|---|
| 3,237,451 | 3/1966 | Haeff | 73/149 |
| 3,413,847 | 12/1968 | Kraushaar | 73/149 |
| 3,585,861 | 6/1971 | Keng | 73/432 |
| 3,769,834 | 11/1973 | Fletcher et al. | 73/149 |
| 4,072,050 | 2/1978 | Ter-Minassian | 73/190 R |
| 4,384,925 | 5/1983 | Stetter et al. | 204/1 T |
| 4,726,216 | 2/1988 | Kohsaka et al. | 73/1 G |
| 4,781,061 | 11/1988 | Baumgartl | 73/149 |

*Primary Examiner*—Robert Raevis
*Attorney, Agent, or Firm*—Russell E. Schlorff; John R. Manning; Edward K. Fein

[57] ABSTRACT

A method for determining the volume of compressible gas in a system including incompressible substances in a zero-gravity environment consisting of measuring the change in pressure ($\Delta P$) for a known volume change rate ($\Delta V/\Delta t$) in the polytropic region between isothermal and adiabatic conditions. The measurements are utilized in an idealized formula for determining the change in isothermal pressure ($\Delta P_{iso}$) for the gas. From the isothermal pressure change ($\Delta P_{iso}$) the gas volume is obtained. The method is also applicable to determination of gas volume by utilizing work (W) in the compression process. In a passive system, the relationship of specific densities can be obtained.

7 Claims, 2 Drawing Sheets

VOLUMETRIC MEASUREMENT OF TANK VOLUME

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

RELATED INVENTION

This invention has subject matter related to the subject matter disclosed in Ser. No. 217,725 filed on Jul. 11, 1988 (MSC-21059-1).

BACKGROUND OF THE INVENTION (1) Field of the Invention

This invention relates to methods and apparatus for ascertaining the volume of liquid in a container or tank, and more particularly, to a system for gauging liquid volumetric quantities based upon the properties of a gas and is operable in a zero gravity environment.

(2) Description of the Prior Art

Prior Art Patents

U.S. Pat. Nos. 3,237,451, 3,413,847 and 3,769,834 all disclose methods to determine the volume of gases in tanks in a zero gravity situation. In U.S. Pat. No. 3,237,451, an acoustic system is utilized for generating pressure changes which are related to volume measurements. In U.S. Pat. No. 3,413,847, density of a gas is measured and related to volume measurements. In U.S. Pat. No. 3,769,834, the volume of a human body is measured by changes in pressure.

U.S. Pat. No. 3,585,861 discloses a system for determining volume of gases by using a reference gas pressure. U.S. Pat. No. 4,072,050 utilizes thermal energy changes for measuring volume. U.S. Pat. No. 4,384,925 utilizes electrochemical sensing procedures for measuring volume. U.S. Pat. No. 4,726,216 relates to a calibration circuit for detecting "HC" gases. U.S. Pat. No. 4,781,061 relates temperature to volume measurements.

BACKGROUND

On the Earth, gauging systems for measuring liquid and gas quantities in a tank invariably rely on the Earth's gravitational field to separate the gas and liquid phases in a consistent and predictable manner. This type of separation provides a flat, or predictable interface of the gas and liquid phases from which volumetric measurements can be made. Current state-of-the-art measurement instruments are designed to locate this separation interface by some measured or inferred change in physical property. Knowledge of the storage tank geometry is then used to calculate the respective volumes of gas and liquid.

In a zero-gravity or weightless environment, however, the gravitational or acceleration body forces are absent, which introduces a number of concerns due to the behavior of the individual phases, both dynamic and static, and the effect on contents gauging systems. These effects may include:

1. no stable, known positioning or interface; configurations can take multiple geometries and this can result in multiple random distribution of interface locations;
2. for certain designs, wetting of sensor surfaces disables measurement capabilities;
3. loss of calibration. A calibration loss in a zero-gravity environment may make the system in-operative since calibration is based upon a fixed, known geometry of the materials in the contained system;
4. point sensor systems may not provide a true picture of the phase locations unless multiple sensors are used and statistical approaches are utilized. Continuous, total body systems require multiple detectors uniformly distributed over the container surface; and
5. temperature and/or composition variations (stratification) can cause significant variations in measurement accuracy.

Because of these effects, current methods for zero-gravity tank gauging are limited to single phase storage (either gas or supercritical) or rely on flow rate measurements into or out of the tank in the case of single phase storage, considerable weight is added to the structure since these systems must be designed for high pressure storage.

Use of inlet/outlet flow gauging measurement may not provide a reliable (accurate) estimate of the tanks liquid contents due to the following restrictions:

1. Two-phase flow. Most flow metering systems are designed to handle single phase systems. Two-phase metering designs are limited in application.
2. Turn-down (range limitations). The turndown range of most flow gauging systems is at best 20 to 1. Non-steady state applications of these instruments is significantly limited.
3. System leaks. Storage tank leaks would go undetected since no direct means are available for contained liquid volume measurement.

In the present invention, the contents in a two phase system including a compressible gas and an incompressible substance are measured independent of the shape of the container or tank and independent of temperature. In another important aspect of the present invention, the ratio of specific heat constants can be obtained in a relatively simple fashion.

DESCRIPTION OF THE PRESENT INVENTION

The present invention may best be understood by reference to underlying principles utilized in the invention.

In a storage tank having a predetermined volume and containing a gas and liquid, the gas is compressed and the compressibility properties of the gas are used to provide a measurement of the liquid volume of the tank by virtue of the following relationship.

$$V_{liq} = V_{tank} - V_{gas} \tag{1}$$

where $V_{liq}$ is the volume of the liquid, $V_{tank}$ is the known volume of the tank, when empty and $V_{gas}$ is the volume of gas.

The gas volume $V_{gas}$ is determined by measuring the total pressure in the tank and the pressure required to change the volume of the gas in the tank by a small known or predetermined amount in a defined period of time. The measurements are utilized in a gas compressibility relationship to determine the gas volume and hence the liquid volume relative to the known tank volume.

In the present invention, a formulation was developed to utilize the measurements of a change in pressure ($\Delta P$) where the volume of the gas is changed by a fixed value ($\Delta V$). From the pressure ($\Delta P$) measurements, the gas volume ($V_{gas}$) can be calculated by use of the following relationship.

$$V_{(gas)} = \frac{-NP\Delta V}{\Delta P} \tag{2}$$

Where "N" is a compressibility constant which is dependent upon the amount of heat generated during compression; P is static pressure in a tank; $\Delta P$ is the measured change in pressure; and $\Delta V$ is the predetermined change in volume. The value of "N" varies from "1" for an isothermal condition and a maximum of about "1.6" for an adiabatic condition for some gases. Most gases of interest to the present invention fall within the range of 1 to 1.6 for "N"

Figure 1:
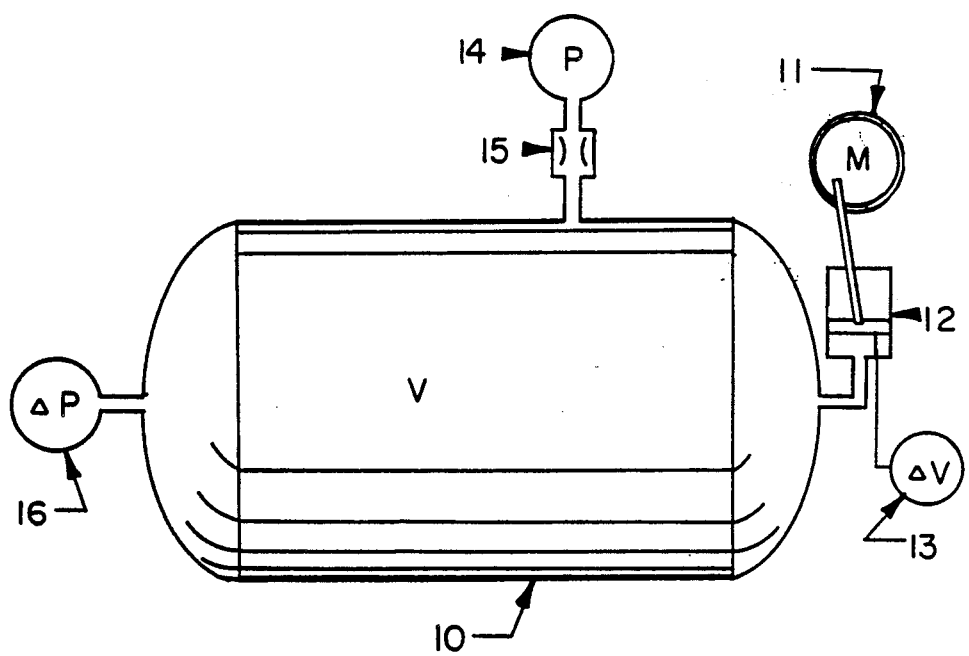
FIG. 1 illustrates a tank and measuring apparatus for practicing the invention.

Referring first to FIG. 1 for orientation relative to physical apparatus, a tank 10 of a known volume V contains a compressible fluid and incompressible substances. A motor 11 drives a volume displacement device 12 which may be a bellows, diaphragm, piston etc. that is driven in a known linear or oscillating manner to produce a known volume change ($\Delta V$) in the tank. The resulting pressure change ($\Delta P$) is a function of the compressibility factor "N" of the gas. The change in volume can be measured by a $\Delta V$ volume measuring device 13. A total pressure gauge device 14 measures the mean pressure in the tank and is coupled to the tank 10 but isolated from instantaneous pressure changes by a snubber 15, if required. A $\Delta P$ pressure measuring device 16 measures the change in pressure. The motor displacement 11,12 produces a constant value of change in volume $\Delta V$ in a time period $\Delta t$ where the time $\Delta t$ can be varied for the known change in volume $\Delta V$.

With a given gas, the gas can be compressed in an isothermal compression region or condition (the compression is accomplished by a change in volume over a very long time period) where the temperature remains constant. The given gas also can be compressed in an adiabatic compression region or condition (the compression is accomplished by a change in volume over very short time period) where there is no measureable heat transfer during the change in volume.

In the present invention a gas is compressed in a tank with a known change of volume ($\Delta V$) for a defined change of time ($\Delta t$) between the critical points for an isothermal condition and an adiabatic condition so that the value of the isothermal pressure change $\Delta P_{iso}$ can be determined. The gas volume in the tank can be determined once the value for $\Delta P_{iso}$ is determined. As set forth in Equation 2, with a known change in volume $\Delta V$, for a given change in time $\Delta t$ and a given pressure (P) and a measured change in differential pressure ($\Delta P$) at isothermal conditions where the value of "N" is one, the volume of the gas (Vgas) can be determined. Equation 2 was derived by taking the derivative of $$PV^N = \text{const.} \tag{3}$$

where P is pressure, V is volume and N is a value dependent upon the amount of heat transferred during the compression process. Equation 3 is the equation of change for a gas compression process between the limits of N equal to a value of one (1) for isothermal conditions to a value about 1.67 for adiabatic conditions. The upper limit of N at adiabatic conditions is equal to ratio of specific heats (K) which is the ratio of $C_P/C_V$ where $C_P$ is the gas heat capacity for constant pressure and $C_V$ is the gas heat capacity for constant volume. The ratio of $C_P/C_V$ is sometimes referred to as the ratio of specific heats. This ratio ranges between approximately $+1.1$ and $+1.67$. It has been determined by analytical and experimental means that the value of "N" between the isothermal region and the adiabatic region is a function of the rate of heat transferred from the compressed/expanded gas to its surroundings, such as the tank wall. The rate of heat transferred is dependent upon the time rate o volume change (or volume displacement rate). Thus, the value for "N" is bounded between two thermodynamic regions where the lower limit of "N" is an isothermal compression region (constant temperature) where the value of "N" is about 1. The upper limit of "N" is the adiabatic compression region (no heat transfer) where the value of "N" is equal to the ratio of specific heats K. The ratio of specific heats K is the ratio of constant pressure specific heat to constant volume specific heat. The ratio K is a function of gas compression and operating conditions, but as noted above, is usually in the range of 1.1 to 1.6.

Figure 2:
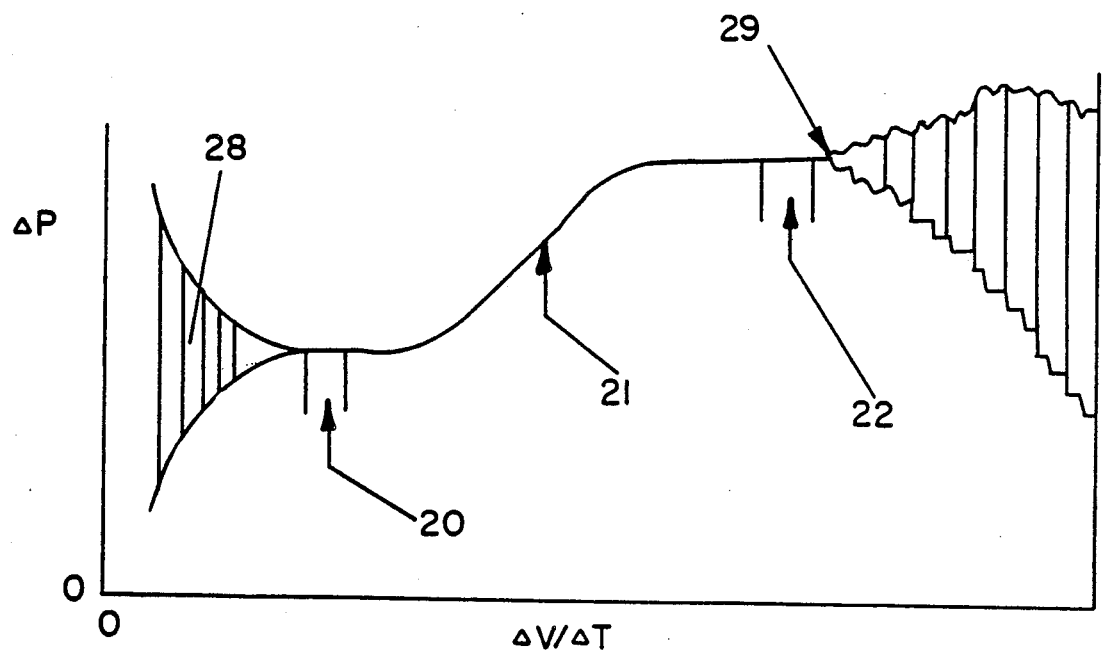
FIG. 2 is a plot of change in pressure versus rate of volume change.

The foregoing described relationship is illustrated in FIG. 2. In FIG. 2, the isothermal region 20 extends to a polytropic region 21 to the adiabatic region 22. In the present invention, the characteristics of the polytropic region 21 are utilized to determine the volume of gas in a tank dependent upon the type of gas, the volume displacement ratio, and the heat transfer characteristics.

While precise characteristics of a given gas between the isothermal region 20 and the adiabatic region 22 can vary, the precise shape of the curve in the polytropic region 21 generally will have the form illustrated and will vary in scalings with repect to the $\Delta V/\Delta t$ scale. Data was obtained and correlated by statistical methods to determine the shape or for the curve 25 for a given gas and a given tank. As shown in FIG. 2, at low volume displacement rates (region 28), environmental effects dominate the shape of the curve and the value of $\Delta P$ will tend to converge to a limiting value in the isothermal region 20 as the volume displacement rate is increased. Volume displace rate is synonymous with a frequency of volume change. At the limiting value of the isothermal region 20, the value of "N" is equal to 1. In the polytrophic region 21, the response of $\Delta P$, as a function of an increase in the volume displacement rate, is a monotonic functional response. In the adiabatic region 22, "N" is equal to "K". The rate of volume displacement increases to a point 29 where error in measurements occur due to slow response time of sensors, vapor/liquid dynamic interference, accoustical noise generated by the volume displacement device and so forth. Measurements above the point 29 may be unreliable because of equipment noise.

The characteristic of the curve 25 in the polytropic region 21 is generally defined by the following equation $$\Delta P_i = \Delta P_{(iso)}(Ae^{-\alpha/f_i} + 1), \tag{4}$$

Where $\Delta P_i$ is the measured differential pressure for the $i^{th}$ measurement, $\Delta P_{(iso)}$ is the differential pressure for isothermal compression (a constant), fi as the frequency ($\Delta V/\Delta t$), and A and $\alpha$ are constants. From a numerical solution of this equation for A and $\alpha$, the value for $\Delta P_{(iso)}$ can be predicted. Solution for the volume is then given by the following relation:

$$V_{(gas)} = \frac{-P\Delta V}{\Delta P_{(iso)}} \quad (5)$$

where N=1.

To obtain the value of $\Delta P_{iso}$, the preferred method is to operate the motor 11 at each of three discrete frequencies ($\Delta V$) and for each frequency to determine the change in pressure $\Delta P$. The change in pressure $\Delta P_{iso}$ can be found by use of Equation 4. With the values of $\Delta V$, $\Delta t$ and $\Delta P$, these measurements can be used to determine the gas volume in the following described manner.

Equation 4 above, can be restated as step function as follows:

$$\Delta P_i = \Delta P_{iso}(Ae^{-\alpha t} + 1) \quad (6)$$

where $\Delta P_i$ is the initial change in pressure, $\Delta P_{iso}$ is the stabilized differential pressure under isothermal conditions, A is a constant which is equal to (Cp/Cv$-$1) where Cp is the specific heat of a gas at a constant pressure and Cv is the specific heat of a gas at a constant volume, $e^{-\alpha t}$ is a time dependent variable which goes from 1 to 0 as time (t) increases.

A rapid volume displacement causes the immediate pressure pulse which decays according to Equation 6. A Computer or other suitable instrumentation performs a numerical analysis for solution of the constants $P_{iso}$, A and $\alpha$ in the equations. From $\Delta P_{iso}$ the volume of gas can be determined from Equation 5.

In further detail of the above, the time dependent variable, when redefined as a time period T of sinusoidal change of pressure, is $$e^{-\beta t} \quad (7)$$

When the value of $\Delta P_i$ is changed to a cyclic value, then the value of $\Delta P_i$ becomes a fluctuating pressure around the pressure value P which is the average pressure. The pressure change $\Delta P_i$ has time period $T_i$. To use this value in computation, it is divided by the total volume change and is a non-cyclic variable. Using the following notations for ease of explanation, where the notations are $$-\Delta V_i = v_i \Delta P_i = p_i \quad (8)$$

the non-cyclic variable is $$p_i/v_i \quad (9)$$

When corrected for phase shift, this gives $$\frac{p_i}{v_i} = \frac{p_{iso}}{v_i}(Ae^{-\beta T_i} + 1) \quad (10)$$

The term $P_{iso}$ is a computed variable which is determined as follows: Using the notation that $$P_{iso}/v_i = X \quad (11)$$

three equations can be written representing each of the three frequency measurement periods, as follows:

$$\frac{p_1}{v_1} = X(Ae^{-\beta T_1} + 1) \quad (12)$$

$$\frac{p_2}{v_2} = X(Ae^{-\beta T_2} + 1)$$

$$\frac{p_3}{v_3} = X(Ae^{-\beta T_3} + 1)$$

With the time period $T_V$ less than time period $T_2$ and the time period $T_2$ is less than $T_3$, three equations and three unknowns A, $\beta$ and $P_{iso}$ can be solved as follows:

$$\frac{p_1}{v_1} - X = XAe^{-\beta T_1} \quad (13)$$

$$\frac{p_2}{v_2} - X = XAe^{-\beta T_2}$$

$$\frac{p_3}{v_3} - X = XAe^{-\beta T_3}$$

The terms A and $e^{-\beta}$ are eliminated by mathematical simplification and by substitution, the following relationship is obtained.

$$\frac{\left(\frac{p_3}{v_3}\right) - X}{\left(\frac{p_2}{v_2}\right) - X} = \left(\frac{\left(\frac{p_2}{v_2}\right) - X}{\left(\frac{p_1}{v_1}\right) - X}\right)^{(T_3 - T_2)/(T_2 - T_1)} \quad (14)$$

The solution of Equation 14 for the value of X can be made by analog or digital computer techniques during each measurement cycle to give a continuously derived value of X that satisfies Equation 14.

Since $$-X = \frac{P_{(iso)}}{v_i} = \frac{\Delta P_{iso}}{\Delta V} = \frac{-P}{V_{(gas)}} \quad (15)$$

and with a known total system pressure, the volume of gas in the tank can be calculated by $$V(gas) = P/X \quad (16)$$

Based upon actual measurement values, the difference in the calculated gas volume determined by the present invention to the actual gas volume in a tank was 3.71 percent.

In utilizing this method it should be noted that the gas volume determination is independent of the properties of the gas in the tank.

The ratio value of specific heats $C_P/C_V$ can be easily obtained with the present invention. The value of $C_P/C_V$ is equal to tank volume times the change in pressure times the tank pressure divided by the change in volume.

Figure 3:
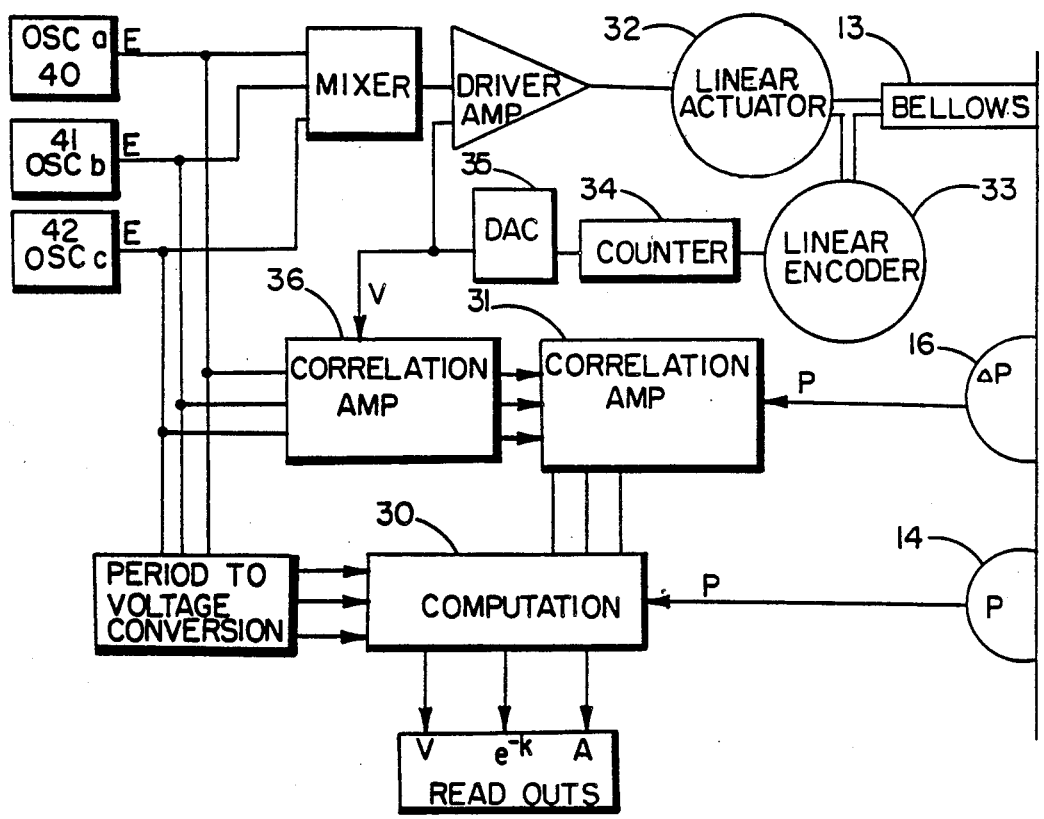
FIG. 3 is a schematic representation of an analog computer system for equation solving.

Referring now to FIG. 3, an analog computer system is schematically illustrated. Pressure readings of pressure are supplied by a pressure sensor 14 in electrical signal form to a computation network 30. The differential pressure sensor 16 supplied differential pressure measurements in electrical signal form to a correlation amplifier 31. The differential volume device 13 is operated by a linear actuator 32 which also drives a linear encoder 33 to provide an electrical signal which is processed by a counter 34 and a digital to analog converter 35 to a correlation amplifier 36. The correlation amplifier 36 supplies the volume measurements for three different times. Separate oscillators 40-42 drive the linear actuator 32 at selected constant volume changes and rates. The output of the oscillators 40-42 also is supplied to the correlation amplifier 36 and to a period to voltage conversion circuit. The output of the period to conversion network is supplied to the computation network 30.

The volume displacement device for these systems is on the order of 1/1000 or less of the total tank volume. Experimental studies have shown that this volume ratio can be 1/100,000 without significant loss in accuracy. The minimum volume change is determined by the sensitivity of the differential pressure and volume displacement sensors. The rate of volume change is typically in the cycles per second range. But this frequency may vary over several orders of magnitude as dependent on the sophistication of the measurement system. The volume displacement device will nominally be of an expanding metal bellows design, since the reliability (life) of these systems are for 1,000,000 cycles or more.

Typical differential gauges used in experimental studies have measurement capabilities that range from 0 to 0.1 in H$_2$O (total span), response times are listed as 0.5 milliseconds. The differential pressure gauge, both in minimum range and in response time, sets the major design parameters for this device.

Figure 4:
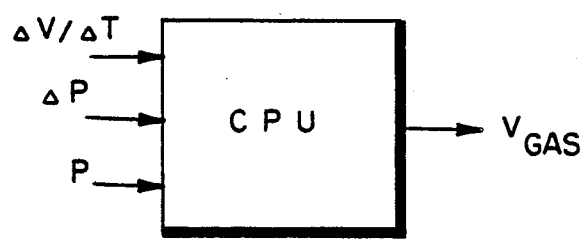
FIG. 4 is a schematic representation of a digital CPU unit for equation solving.

As shown in FIG. 4, a CPU 40 can be programmed to receive the $\Delta P$, $\Delta V/\Delta T$ and pressure measurements for three frequencies of operation and digitally process the data for determining the volume of gas.

Another approach to determining the volume of gas in a tank is to obtain values for pressure (P) and volume (V) at two different frequencies. If $\gamma$ is a known value of the ratio of specific heats $C_P/C_V$ and the term $$(\gamma - 1) = A \tag{17}$$

is substituted for A in the first two equation sets of Equation 13 then the following equation sets result.

$$\frac{\frac{p_1}{v_1} - X}{X(\gamma - 1)} = e^{-\beta T_1} \tag{18}$$

$$\frac{\frac{p_2}{v_2} - X}{X(\gamma - 1)} = e^{-\beta T_2}$$

The term $e^{-\beta}$ is eliminated by combining the two equation sets of Equation 18 which give $$\frac{\left(\frac{p_1}{v_1}\right) - X}{(X(\gamma - 1))} = \left(\frac{\frac{p_2}{v_2} - X}{X(\gamma - 1)}\right)^{T_1/T_2} \tag{19}$$

The solution of Equation 19 for the valued X is similar to the solution of Equation 14 above.

In another aspect of the invention, a work meter 45 as shown in FIG. 1 derives an electrical signal representative of work during the compression process and is used to sense the work input "W" during the compression process so that "N" can be determined from the equation, $$W = \frac{\Delta(PV)}{N - 1}, \text{ where } N \neq 1 \tag{20}$$

After determining "N", the value of "N" is substituted into Equation 2 for determining the gas volume. As before, the formulation solution can be a computer using programming in a conventional manner.

The system of the present invention further monitors the density change (or temperature or pressure) for a given volume change so that the gas volume can be determined. This is basically a passive tank gauging measurement since no complex moving parts are required. The driving force that causes the volume change is due to variations in the tank temperature due to external environmental temperature changes. In other words, a temperature change external to the tank produces a pressure rise or fall in the tank.

The relationship of the volume of a simple compressible substance for most gases is $$V_{(gas)} = \frac{-\Delta V}{1 - (v_2/v_1)} \tag{21}$$

For most gases, PVT equations of state can be used for solution of specific volume which gives $$V_{(gas)} = \frac{-\Delta V}{1 - \left(\frac{1 + \Delta T/T}{1 + \Delta P/P}\right)} \tag{22}$$

Thus with the determination of temperature changes and pressure changes over a long period of time, the gas volume can be determined from the relation set forth in Equation 22.

It will be apparent to those skilled in the art that various changes may be made in the invention without departing from the spirit and scope thereof and therefore the invention is not limited by that which is enclosed in the drawings and specifications but only as indicated in the appended claims.

We claim:

1. A method for determining the volume of a container containing at least one compressible gas and at least one incompressible substance independent of the shape of the container and independent of temperature by the steps of:

producing a change in volume ($\Delta V$) and pressure change ($\Delta P$) in said container over a known period of time ($\Delta t$) and determining the change pressure ($\Delta P$) in said container while said gas is in a polytropic region between a compressibility factor (N) equal to one (1) for an isothermal region and a compressibility factor (N) equal to K, the adiabatic coefficient for an adiabatic region, establishing a predetermined relationship of the change in pressure $\Delta P$ as a function of the rate of change of volume ($\Delta V/\Delta t$) for said polytropic region between said isothermal region and said adiabatic region, determining from said predetermined relationship, the value of the change in pressure ($\Delta P_{iso}$) for isothermal conditions, and determining the volume of the compressible gas by measuring the median gas pressure (P) and utilizing the measured gas pressure P, the change in volume $\Delta V$ and the determined $\Delta P_{iso}$ in the formula $$V_{(gas)} = \frac{-P\Delta V}{\Delta P_{(iso)}}.$$

2. The method as set forth in claim 1 wherein said predetermined relationship is defined by the formula $$\Delta P_i = \Delta P_{(iso)}(Ae^{-\alpha/fi} + 1),$$

where $P_i$ is the measured differential pressure for the $i^{th}$ measurement, $P_{iso}$ is the differential pressure for isothermal conditions (a constant), fi is the frequency ($\Delta v/\Delta t$), and A and $\alpha$ are constants.

3. The method as set forth in claim 2 wherein the $\Delta P_i$ determination is made for at least three distinct values of $\Delta V/\Delta t$ in the polytropic region.

4. The method as set forth in claim 3 wherein the change in volume($\Delta V$) is held constant and the value of $\Delta t$ is varied to obtain the three different values of $\Delta V/\Delta t$.

5. The method as set forth in claim 4 wherein the determination of P, $\Delta P_i$ and $\Delta t$ for said three different values are solved by simultaneous equations to obtain the volume of gas.

6. A method for determining the volume of a container containing at least one compressible gas and at least one incompressible substance independent of the shape of the container and independent of temperature by the steps of:

producing a change in pressure ($\Delta P$) value and a change in volume ($\Delta V$) in said container over each of three different time periods in a range of values for $\Delta V/\Delta t$ between an isothermal condition and an adiabatic condition, determining the change of pressure $\Delta P_{iso}$ for isothermal conditions from the relationship of $$\Delta P_i = \Delta P_{iso}(Ae^{-\alpha t} + 1).$$

where $\Delta t$ is the time period $\Delta P_i$ is the initial change in pressure, $\Delta P_{iso}$ is the stabilized differential pressure under isothermal conditions, A is a constant which is equal to (Cp/Cv − 1) where Cp is the specific heat of a gas at a constant pressure and Cv is the specific heat of a gas at a constant volume, $e^{-\alpha t}$ is a time dependent variable which goes from 1 to 0 as time (t) increases, for each of the three time periods, determining the volume of gas by the use of the determined value of $\Delta P_{iso}$ in the relationship of $$V_{(gas)} = \frac{-P\Delta V}{\Delta P_{(iso)}}.$$

7. A method for determining the volume of a container containing at least one compressible gas and at least one incompressible substance independent of the shape of the container and independent of temperature by the steps of:

dynamically producing a known change in volume ($\Delta V$) and pressure change ($\Delta P$) in said container and determining the adiabatic pressure, determining the subsequent isothermal pressure in said container after said gas reaches an isothermal pressure, and determining the time period to change from adiabatic pressure to isothermal pressure, then determining the volume of gas from the relationship $$\Delta P_i = \Delta P_{iso}(Ae^{-\alpha t} + 1)$$

where $\Delta P_i$ is the initial change in pressure, $\Delta P_{iso}$ is the stabilized differential pressure under isothermal conditions, A is a constant which is equal to (Cp/Cv − 1) where Cp is the specific heat of a gas at a constant pressure and Cv is the specific heat of a gas at a constant volume, $e^{-\alpha t}$ is a time dependent variable which goes from 1 to 0 as time (t) increases.

* * * * *